United States Patent [19]

Toyoda et al.

[11] Patent Number: 4,671,651
[45] Date of Patent: Jun. 9, 1987

[54] SOLID-STATE OPTICAL TEMPERATURE MEASURING DEVICE

[75] Inventors: Taro Toyoda; Yasukazu Seki, both of Kanagawa, Japan

[73] Assignee: Fuji Electric Corporate Research and Development Ltd., Japan

[21] Appl. No.: 562,881

[22] Filed: Dec. 19, 1983

[30] Foreign Application Priority Data

Dec. 17, 1982 [JP] Japan .................. 57-221169

[51] Int. Cl.$^4$ ............................................. G01K 11/00
[52] U.S. Cl. .................................... 356/44; 374/161
[58] Field of Search .................. 356/44, 43; 250/227, 250/277; 374/160, 161; 423/511; 252/62.3 V

[56] References Cited

U.S. PATENT DOCUMENTS

| | | | |
|---|---|---|---|
| 4,136,566 | 1/1979 | Christensen | 356/44 X |
| 4,140,393 | 2/1979 | Cetas | 356/44 X |
| 4,355,910 | 10/1982 | Quick et al. | 356/44 X |
| 4,376,890 | 3/1983 | Engstrom et al. | 356/44 X |

FOREIGN PATENT DOCUMENTS 0111437  9/1981  Japan .................. 374/161

OTHER PUBLICATIONS

Abdullaev et al., "Photoconductivity of Gold-Doped Cadmium Indium Sulfide Single Crystals Doped Gold, Recombination Scheme", Sov. Phy. Semicond., vol. 7, No. 11, May 1974, pp. 1428-1431.

Abdullaev et al., Chemical Abstracts: "Photoconductivity of Gold-Doped Cadmium Gallium Indium Sulfide (CdInGaS$_4$) Single Crystals", vol. 80, 1974, No. 12, Abstract No. 64860.

Abdullaev et al., Chemical Abstracts: "Investigation of Vibrational Spectra of CdInGaS$_4$ Crystals by means of IR Spectroscopy", vol. 82, 1975, No. 22, Abstract No. 147793.

Allakhverdiev et al., Chemical Abs.: A method of Measurement of the Refractive Indexes of Crystals with Layered Structure", vol. 93, 1980, No. 16, Abstract No. 158087.

Glatzel and McDonough, "Temperature Measurement Technique Using Fresnel Interference Technique", IBM Technical Disclosure Bulletin, vol. 20, No. 11A, 1978, Apr., pp. 4571-4572.

Primary Examiner—R. A. Rosenberger
Attorney, Agent, or Firm—Sughrue, Mion, Zinn, Macpeak, and Seas

[57] ABSTRACT

A temperature detecting device employing as a temperature detecting element a CdInGaS$_4$ compound semiconductor material. The temperature of a body in thermal contact with the temperature detecting element is determined using either a reflecting or an absorbing technique. CdInGaS$_4$ semiconductor material used as a light detecting element provides a temperature measuring range of about −200° C. to about 400° C.

6 Claims, 6 Drawing Figures

SOLID-STATE OPTICAL TEMPERATURE MEASURING DEVICE

BACKGROUND OF THE INVENTION

The present invention relates to a device for optically measuring temperature employing the phenomenon of variation of the photoabsorption of a semiconductor optical crystal with temperature. Such a device for optically measuring temperature is generally required to be capable of measuring temperature over a wide range and to be reliable within the range of temperature to be measured over long periods.

Devices for optically measuring temperature heretofore proposed may be broadly divided into two classes, a first wherein an optical fiber is connected between the object of which the temperature is to be measured and an infrared sensor, and a second, termed a contact type, which includes a detection element, for which an optical transmission property varies with temperature, disposed in contact with the object and and arranged to modulate a signal light beam carried by an optical fiber.

The temperature measuring device of the first type is suitable for measurement of high temperatures since it generally is usable in a temperature range of more than about 500° C. However, such a device is not usable below about 500° C., and hence cannot be applied to most industrial temperature measuring applications.

The temperature measuring device of the second type has been known to include four different types of detecting elements. These include (a) a bimetallic or thermocouple element, (b) a double-refractive crystal, (c) a liquid crystal having a temperature-dependent refractive index, and (d) a phosphorescent material having a white absorption characteristic which varies with temperature. However, temperature measuring devices which employ such materials suffer from drawbacks in thermal stability and mechanical stability. Also, such devices are generally limited to use at a maximum temperature of about 350° C.

In a further attempt to provide a temperature measuring device which performs satisfactorily at moderate and low temperatures, it has been proposed to employ a semiconductor or compound semiconductor material as a contact-type detector. In such an approach, a light beam from a semiconductor laser passes through the temperature detecting element in an amount determined by the temperature of the detecting element. Optical absorption and wavelength characteristics of the temperature detecting element are selected to correspond to those of the semiconductor material of the light source. More specifically, for an AlGaAs semiconductor laser emitting light at about 0.8 microns, temperature detecting elements fabricated with combinations of GaAs or CdTe have been used. However, due to limitations imposed by the spectral width of the light source, the maximum temperature which can be measured using such a device is about 200° to 300° C. Moreover, such compound semiconductor materials have a solid solution phase which is present at temperatures of above about 300° C. which means that such materials do not have the desired thermal stability.

Accordingly, it is a primary object of the present invention to provide a temperature measuring device which is free from the drawbacks of prior art devices.

More particularly, it is an object of the present invention to provide a temperature measuring device which is capable of measuring temperatures over a wide range, yet which is reliable and stable over a wide range of temperatures and over long periods of time.

SUMMARY OF THE INVENTION

In accordance with the above and other objects, there is provided a temperature measuring device of the contact type which employs for a temperature detecting element $CdInGaS_4$ quarternary compound semiconductor material. The inventors have discovered that this material makes possible stable and reliable temperature measurements over a wide temperature range. Moreover, $CdInGaS_4$ semiconductor material can easily be fabricated in the form of a high quality laminar single crystal using a Bridgeman method. Also, an optical quality homogeneous laminar single crystal can easily be fabricated using a simple vapor-phase growth technique. In such a case, the thickness of the crystal can easily be controlled and a temperature detecting element having a desired characteristic can easily be formed without the use of a polishing process.

DESCRIPTION OF THE PREFERRED EMBODIMENTS

Figure 1:
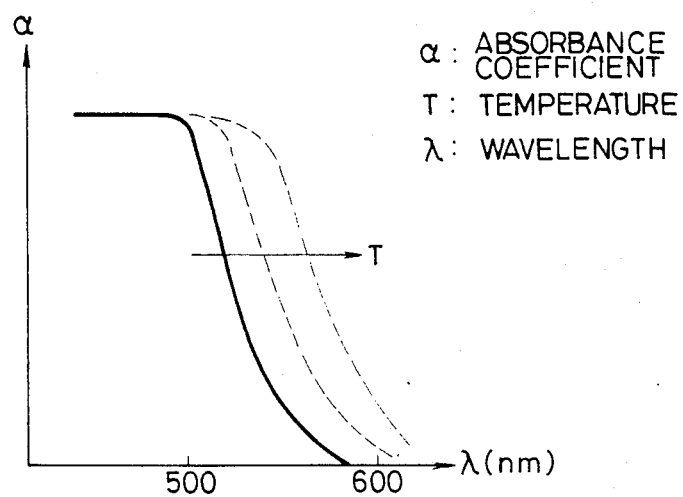
FIG. 1 is a graphical representation of a light absorption characteristic of $CdInGaS_4$ semiconductor material.
Figure 2:
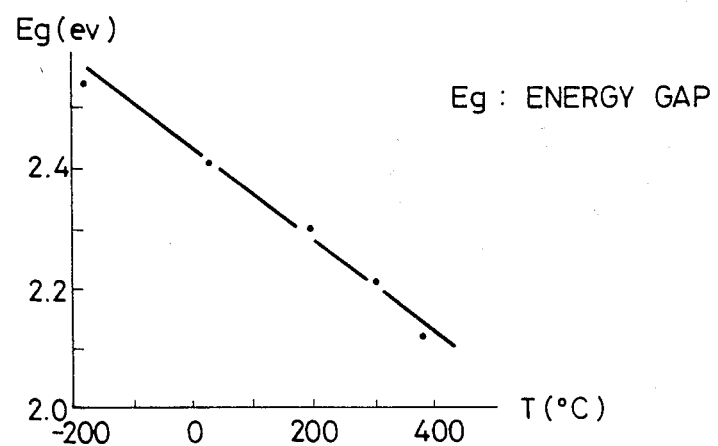
FIG. 2 is a graphical representation of a temperature characteristic of $CdInGaS_4$ semiconductor material.

Referring now to FIG. 1, a light absorption characteristic of $CdInGaS_4$ semiconductor material is shown. FIG. 2 is a graph showing the effect of temperature on an energy gap of this material. As FIG. 1 shows, the wavelength $\lambda_g(T)$ at which the absorption coefficient rapidly falls off from its maximum value is strongly a function of temperature. Particularly, the fall-off wavelength $\lambda_g(T)$ of the absorption coefficient $\alpha$ falls off rapidly at wavelengths between 500 and 600 microns, dependent upon temperature, which wavelength range is within the optical spectrum. It can be demonstrated that the fall-off wavelength $\lambda_g(T)$ is related to the energy gap $E_g(T)$ by the relationship $\lambda_g(T) = 1.24/E_g(T)$ over a temperature range of about −200° to 400° C. The change in $\lambda_g(T)$ is about 0.16 microns/°C. Thus, it can readily be appreciated that a temperature detecting element fabricated of $CdInGaS_4$ is superior to one fabricated of GaAs which has a linear range extending in the negative direction to only about −150° C. and which has a temperature rate of change of $\lambda_g(T)$ about twice that of $CdInGaS_4$. Moreover, $CdInGaS_4$ is stable at temperatures of greater than 500° C., and is resistant to oxidation and moisture absorption, thus providing a high stability over wide temperature ranges and over long periods of time.

Figure 3:
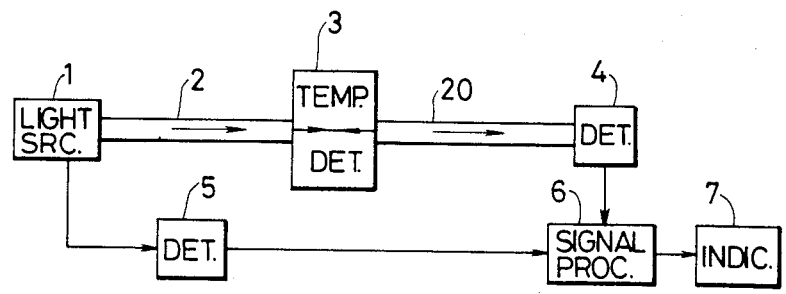
FIGS. 3 through 6 show respective first through fourth embodiments of a temperature measuring device constructed in accordance with the present invention.

FIG. 3 is a block diagram illustrating a first embodiment of an optical temperature measuring device of the invention. In this device, light emitted by a light source 1 passes through an optical fiber 2, and thence is incident upon a temperature detecting element 3 fabricated of $CdInGaS_4$ quarternary compound semiconductor material. Preferably, the light source 1 is a source which emits white light to thus provide a wide operating range. The operating range may be restricted to a desired range by providing a suitable optical filter to filter the output of the light source 1. Also, it is possible to use a light-emitting diode, or semiconductor laser, for the light source 1 to provide measurement over a narrow temperature range. In any case, the temperature detecting element 3 should be in close thermal contact with the object of which the temperature is to be measured.

The light passing through the temperature detecting element 3 is conducted by an optical fiber 20 to a light detector 4. In order to compensate for fluctuations in the output of the light source 1, a portion of the output from the light source 1 is passed directly to a second light detector 5. The sensed temperature is then computed by a determination of the ratio of the output of the first and second light detectors 4 and 5, respectively, with a signal processor 6. The computed temperature is then displayed by an indicator 7.

Figure 4:
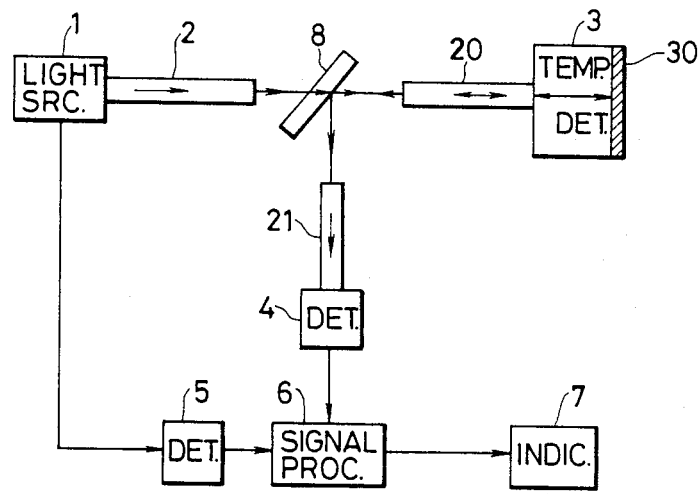

FIG. 4 shows a second embodiment in which light reflection is employed. More specifically, in the second embodiment, a first portion of the output from the light source 1 passes through an optical fiber 2 and is incident upon a beam splitter 8. One output beam from the beam splitter 8 passes through a second optical fiber 20 to a temperature detecting element 3, again fabricated of $CdInGaS_4$ semiconductor material. This light flux is reflected by a reflecting coating 30 back through the temperature detecting element 3, and thence via the optical fiber 20 to the beam splitter 8. The reflected light flux from the beam splitter 8 passes through a third optical fiber 21, reaching a first detector 4. A second portion of the output of the light source 1 is passed directly to a second detector 5. As in the first-described embodiment, a signal processor 6 computes the sensed temperature from a ratio of the outputs of the detectors 4 and 5.

Figure 5:
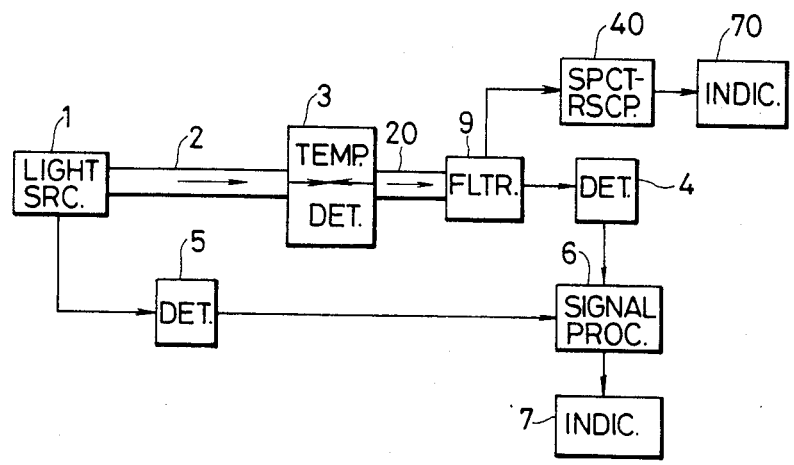
Figure 6:
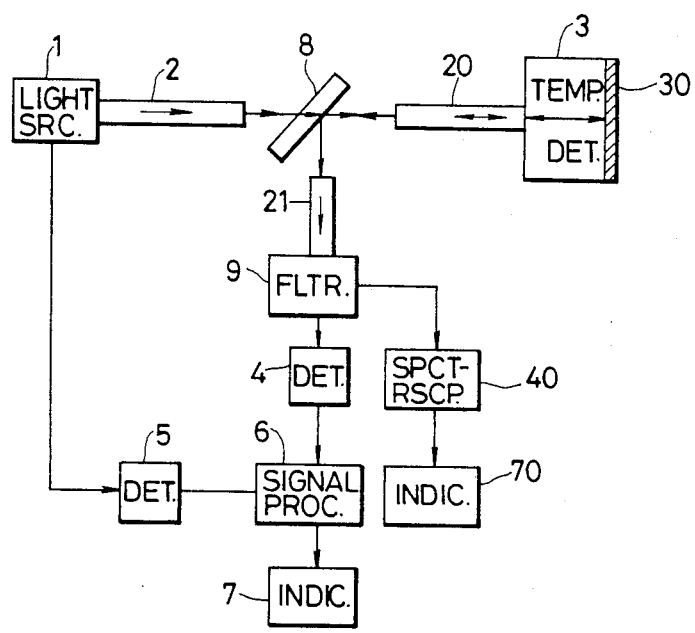

The embodiment of FIG. 5 differs from the first embodiment of FIG. 3 in the addition of a branching filter 9, spectroscope 40, and a second indicator 70. The branching filter 9 divides the light flux at the output end of the optical fiber 20 into two parts, one being applied to the first detector 4 and the other to the spectroscope 40. The embodiment of FIG. 6 is similarly substantially identical to the second embodiment of FIG. 4, except for the provision again of a branching filter 9, a spectroscope 40 and a second indicator 70. The embodiments of FIGS. 5 and 6 are capable of providing a direct indication of the sensed temperature based upon a directly measured wavelength of the light received at the spectroscope 40.

Accordingly, it can be appreciated that a temperature measuring device of the present invention employing $CdInGaS_4$ quarternary compound semiconductor material for the temperature detecting element has several distinct advantages. These include:

(1) $CdInGaS_4$ is stable at high temperatures and provides reliability over long periods of time.

(2) $CdInGaS_4$ is stable over a wide temperature range.

(3) $CdInGaS_4$ can easily be fabricated in the form of a high quality single crystal at a low cost.

(4) $CdInGaS_4$ can readily be grown as a laminar single crystal which is very flat and of good quality using a vapor-phase method, in which case no polishing process is required.

(5) By employing a light source which emits white light, temperatures can be easily measured over a wide temperature range, and the temperature range measured can readily be determined with the use of a filter.

We claim:

1. A device for measuring temperature, comprising:
   a light source producing a first beam of output light;
   a temperature detecting element disposed in a path of said beam, said temperature detecting element being in intimate thermal contact with an object the temperature of which is to be measured, said temperature detecting element comprising a body of $CdInGaS_4$ quarternary compound semiconductor material; and
   means for detecting the intensity of a second beam of light, said second beam resulting from a transmission of said first beam through said temperature detecting element; and
   an indicator for displaying an output of said detecting means, said output providing a temperature measurement of said object.

2. The temperature measuring device of claim 1, wherein said light source comprises a source of white light.

3. The temperature measuring device of claim 2, wherein said detecting means comprises a first detector for detecting the intensity of light of said second beam passing through said temperature detecting element, a second detector for detecting a portion of light emitted directly from said light source, and signal processing means for computing a ratio of an output of said first detector to an output of said second detector.

4. The temperature detecting device of claim 3, further comprising a branching filter disposed between said temperature detecting element and said first detector, a first output of said branching filter being directed to said first detector, a spectroscope receiving a second output of said branching filter, and a second indicator for displaying an output of said spectroscope.

5. The temperature measuring device of claim 2, further comprising a beam splitter disposed between said light source and said temperature detecting element and a reflective coating formed on a surface of said temperature detecting element opposite said beam splitter, and wherein said detecting means comprises a first detector disposed to receive a flux of light reflected by said reflective coating and said beam splitter, a second detector for detecting a portion of light emitted directly from said light source, signal processing means for computing a ratio of an output of said first detector to an output of said second detector, and an indicator for displaying an output of said signal processing means.

6. The temperature detecting device of claim 5, further comprising a branching filter disposed between said beam splitter and said first detector, a first output of said filter being applied to said first detector; a spectroscope receiving a second output of said branching filter; and a second indicator for displaying an output of said spectroscope.

* * * * *